March 7, 1967 M. STIMLER ET AL 3,307,448

OUTPUT ENERGY INDICATING OPTICAL MASER

Filed May 15, 1963

INVENTORS.
MORTON STIMLER
RODNEY E. GRANTHAM

R. F. Housfeld
N. M. Hicks

BY

ATTORNEYS

United States Patent Office 3,307,448
Patented Mar. 7, 1967

3,307,448
OUTPUT ENERGY INDICATING OPTICAL MASER
Morton Stimler, Hyattsville, and Rodney E. Grantham, Bethesda, Md., assignors to the United States of America as represented by the Secretary of the Navy
Filed May 15, 1963, Ser. No. 280,756
4 Claims. (Cl. 88—23)

The invention described herein may be manufactured and used by or for the Government of the United States of America for governmental purposes without the payment of any royalties thereon or therefor.

This invention relates to an optical maser and more particularly to a maser device having means therein for indicating the output energy of a pair of maser beams issuing simultaneously from opposite ends of a rod-like maser element contained within the instrument.

This invention may be advantageously employed for various purposes. When a pulsed light beam, such, for example, as a maser beam, is employed for a destructive purpose, it is highly desirable not only to ascertain the extent of the destruction caused by the beam but also the light pulse energy of the electromagnetic wave thereof causing the destruction.

In the field of optical masers, it has been the general practice to employ calorimeter devices to measure the output light pulse energies. Although such devices have served the purpose heretofore, they have not proved satisfactory in the measurement of maser powers of high orders of magnitude. The calorimeter principle requires that the electromagnetic energy be converted to heat in an absorber (black body) material. But the peak power of maser systems is so great that known absorber materials are vaporized. Vaporization can be eliminated by diverging the maser beam to distribute the energy over a large absorber area. The problem encountered here is that the calorimeter then becomes very large physically. Also, accuracy cannot be achieved because it is difficult to measure the temperature rise over the large absorber area. Furthermore, calorimeter devices destroy the maser beam thereby rendering it useless for its intended purpose. Maser powers are also expected to increase by several orders of magnitude thereby enhancing the need for a new method of measuring maser energies.

The general purpose of this invention is to provide a new and improved optical maser having means for measuring the energy in a pair of pulsed light beams issuing therefrom without the destruction of the beams, which embraces all the advantages of similarly employed measuring instruments and possesses none of the aforedescribed disadvantages.

To obtain this desirable result, the present invention contemplates the use of an instrument of improved design for converting the electromagnetic momentum of a pair of maser beams to angular momentum of a torsion balance system to get a direct indication of the energy of the beam. The present invention contemplates a light operated torsion ballistic pendulum carrying a pair of light reflecting devices rigidly secured thereto on opposite sides of the axis of rotation thereof in alignment with a rod-like maser element fixedly disposed therebetween in a horizontal plane and having the center thereof in intersecting relation with the axis of rotation of the light reflecting devices, the reflecting devices having planar reflecting surfaces arranged at an angle with respect to the direction of propagation of the pulsed beam of light issuing from the respective end of the maser element normally associated therewith as to impart an impulse force couple to the interconnected light reflecting devices sufficient to move the ballistic pendulum element comprising the light reflecting devices to a moved position correlative with the combined energy of the beams of pulsed light emitted by the maser element as the maser element is fired. An optical system is preferably provided within the instrument for reflecting the light beams reflected from the reflecting surfaces in such manner that the beams are directed outwardly and emerge from the instrument in a predetermined direction in closely spaced mutual parallelism or, if desired, the optical system may be adjusted at will to a predetermined setting such that the beams outgoing from the instrument will intersect at a predetermined distance therefrom.

The present invention works on the principle of conservation of momentum by reflection of a pair of maser beams impinging on a pair of highly reflective surfaces respectively rather than the calorimeter principle of energy absorption used in prior devices. Thus, there is no problem of vaporizing absorber material or of measuring the temperature rise of an absorber. The instrument is capable of handling power levels many orders of magnitude in excess of the presently available maser powers. Furthermore, less time is required between successive measurements with this instrument than with a calorimeter because with the latter device it is necessary to wait until the absorber material has cooled before another light beam can be measured. The instrument can be placed in a position to direct the measured beams to the object to be illuminated and, in the operation of the device, the energy of each pulse is measured without extracting appreciable energy therefrom or otherwise destroying the utility of the measured beams.

One of the objects of this invention is to provide a new and improved instrument having a maser element therein for measuring the energy in the pulsed electromagnetic waves generated by the optical maser element.

Another object is to utilize the radiation pressure of a pair of electromagnetic waves issuing from opposite ends of a rod-like maser element simultaneously on a pair of reflecting surfaces to provide a means of measuring the total energy of the pulsed output thereof without destroying the effectiveness of the light pulses.

A further object is to provide a new and improved device for measuring, by movement of a ballistic pendulum, pulsed light energy issuing from opposite ends of a maser element.

Still another object is to provide an energy measuring maser responsive to electromagnetic waves issuing simultaneously from opposite ends of a rod-like maser element positioned therein and for reflecting the output electromagnetic waves in mutually parallel closely spaced relation in a predetermined direction.

A still further object is to provide a new and improved reflecting system for actuating a ballistic pendulum to a setting correlative with the pulsed energy issuing from opposite ends of the maser element in which means are provided for directing the pair of maser beams emerging from the instrument into mutually intersecting relation at a predetermined distance therefrom.

Still other objects and features of the invention will become apparent to those skilled in the art as the disclosure is made in the following detailed description of the invention taken in connection with the accompanying sheet of drawing in which.

Figure 1:
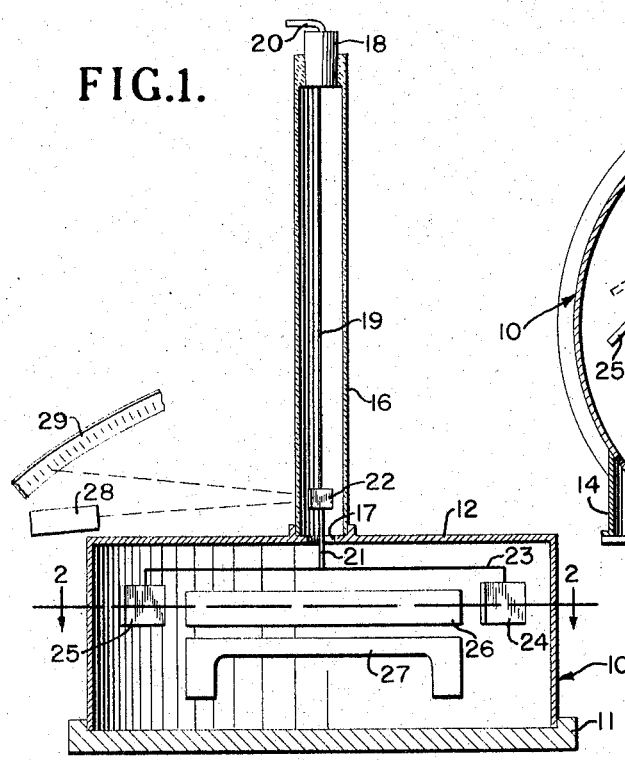
FIG. 1 is a schematic view partially in section of an instrument for measuring a pair of pulsed beams of light from a maser element disposed therein.

Referring now to the drawing wherein like reference characters are employed to designate like or corresponding parts throughout the several views and more particularly to FIG. 1 thereof there is shown thereon a ballistic torsion pendulum generally indicated as 10. The instrument comprises a base 11 preferably of cylindrical configuration to which is secured in hermetically sealed relation therewith a cylindrical casing 12 having a pair of openings 13 therein disposed on opposite sides of the cylindrical upstanding portion of the casing. A pair of sleeves 14 are secured to the casing in sealed relation therewith opposite each of the apertures respectively, each of the sleeves having a transparent window 15 composed of material suitable for the purpose, such, for example, as glass or the like, through which the output beams from a maser element are projected. The casing 12 is provided with an elongated glass cylinder hermetically sealed thereto and of hollow configuration. The hollow cylinder or tubular member is securely supported by and sealed to the flat portion of the casing in a vertical position in alignment with an aperture 17 formed about the axis of the casing as shown. The upper portion of the tubular member 16 is configured for sealing engagement with a stopper 18 which may be of glass or other material suitable for the purpose and which supports one end of a slender torsion wire 19. The lower end of the torsion wire is connected to a rod 21 carrying a reflecting mirror 22 at the upper end portion thereof. A support rod 23 is connected at its midpoint to the lower end of rod 21 and perpendicular thereto. Two parallel reflecting mirrors 24 and 25 are rigidly secured to the support rod, one at each end as shown. Each reflecting mirror is composed of a plate of glass covered with metal and inclined at a 45° angle with respect to a vertical plane passing through the center portions of the respective reflecting surfaces thereof. It has been found that a thin sheet of material of high reflectivity and high thermal conductivity should be used, as for example, silver, gold or aluminum to reduce "radiometer" effects. The reflecting surfaces of mirrors 24 and 25 are optically opposed and mutually parallel. A light pulse generating device such as the rod-like maser element 26 illustrated is supported by the base 11 in any well known manner in a horizontal position with the axis thereof in alignment with the center portions of mirrors 24 and 25 when the support rod 23 is in an initial position of rest. A flash tube 27 is disposed immediately beneath the maser element and in close proximity thereto for causing the maser element to fire as the flash tube operates. If desired, the flash tube and maser element may be wrapped throughout the length thereof by a length of tape the convolutions of which pass around both the flash tube and the maser element to increase the effectiveness of the transfer of light from the flash tube to the maser element. The support means for the maser element and flash tube may be of any well known construction and, per se, form no part of the present invention. A light projector 28 causes a steady beam of light to be focused on mirror 22 in such manner that the reflected beam therefrom is directed to a scale 29 having a plurality of indicia markings thereon of such character that the instant angular position of the support rod 23 from the initial position of rest thereof is constantly made manifest. The stopper 18 is provided with a rotatable zero adjusting support 20 for the upper end of torsion wire 19 constructed and arranged to permit adjustment of the support rod 23 and mirrors carried thereby to a predetermined initial position of rest, the structure of the zero adjusting element being of any well known type whereby small rotative movements thereof may be made without adversely effecting the hermetic sealed condition of the instrument. When the ballistic element is in the initial or zero position the maser beams are reflected outwardly from the instrument as shown on FIG. 2 or FIG. 3, as the case may be. When the ballistic element is in the zero or initial position of rest, one pulsed light ray is reflected from the mid-point of mirror 24 and the other pulsed light ray is reflected from the center of mirror 25, each at a 90° angle with respect to the rays impinging the mirrors whereby the output rays reflected therefrom are parallel and of opposite direction as clearly shown on FIG. 2. The ballistic torsion pendulum carried by torsion wire 19 within casing 12 is free from "radiometer" effects as the result of electromagnetic waves impinging thereon by reason of the fact that air has been evacuated from the casing by any suitable means, not shown.

The operation of the measuring instrument will now be described. Let it be assumed, by way of example, that a pulsed light ray is fired from opposite ends of the maser element 26 and the rays issuing from the maser element are reflected from mirrors 24 and 25 and thence outwardly through the windows 15. The directional change of momentum at mirror 24 caused by the pulsed light reflected therefrom causes an impulse of force $f_1$ to be imparted to the mirror 24, which force acts on a lever arm corresponding to the supporting portion of the support rod carrying the mirror 24 to exert a clockwise torque on the torsion wire 19. Likewise, the reflection of the pulsed light ray from the opposite end of the maser element impinging mirror 25 causes an impulse force $f_2$ to be imparted to mirror 25, which force acts on a lever arm corresponding to the portion of the support rod 23 carrying the mirror 25 to exert an additional clockwise torque on the torsion wire 19. It can readily be seen, therefore, that a force couple acting in a clockwise direction results.

Figure 2:
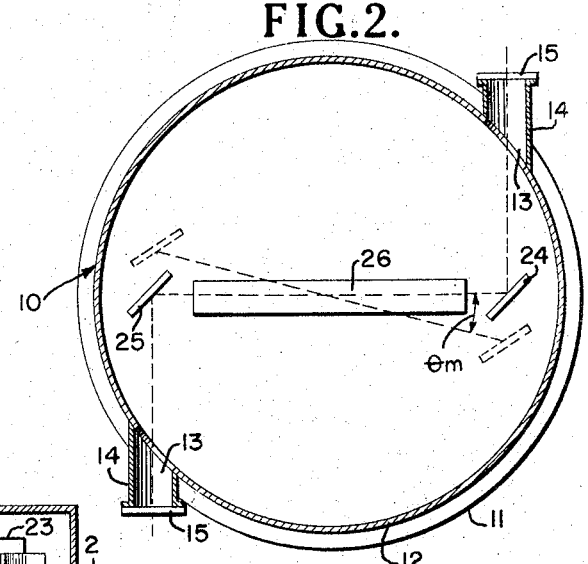
FIG. 2 is a view of the device of FIG. 1 taken along line 2—2 thereof and showing the pair of reflecting elements in an initial position and in a moved position.

As the torsion wire is twisted in a clockwise direction through an angle $\theta_m$, FIG. 2, the light rays from the indicator light source 28 are reflected by the indicator mirror 22 to a new position on the indicator scale with respect to the reference point on the scale at which the light rays from the projector 28 were directed before the maser element was fired, the position of the mirrors 24–25 being shown in dashed outline. Thus, the indicator light ray moves through an angle which is proportional to the energy of the pulsed light rays in accordance with the sensitivity calculations of the system.

The basic equation of the instrument for the case of normal incidence of a light beam on a single reflecting mirror is derived as follows:

To find the theoretically expected deflection, let V be the energy in each incident maser beam and c be the velocity of light. The momentum $p$ of each incident beam will be:

(1) $$p = \frac{V}{c}$$

If it is assumed that the reflectivity of mirrors 24 and 25 is unity, and the reflecting mirrors are stationary during the duration of the maser pulse (several microseconds) then by the law of conservation of angular momentum (2) $$Iw_0 - pR - pR = 0$$

where,
R is the radius of gyration of the pendulum.
I is the moment of inertia of the pendulum.
$w_0$ is the initial angular pelocity of the pendulum.

The angular momentum of each beam about the axis of the torsion wire is represented by $-pR$ at each mirror after reflection therefrom. The initial angular momentum of the suspension system is represented by $Iw_0$.

Substituting Equation 1 in Equation 2 results in, (3) $$Iw_0 = \frac{2VR}{c}$$

Since the initial kinetic energy of the pendulum becomes the final potential energy of the torsion wire, $$K.E. = P.E.$$

(4) $$\tfrac{1}{2}Iw_0^2 = \tfrac{1}{2}K\theta_m^2$$

where,

K is the spring constant of the torsion wire,
$\theta_m$ is the maximum angular deflection of the pendulum after the impulse.

Solving Equations 3 and 4 for V (5) $$V = \frac{c\theta_m\sqrt{IK}}{2R}$$

The angle $\theta_m$ can be ascertained since, (6) $$2\theta_m = \frac{d_m}{D}$$

where, $d_m$ is the maximum deflection on the indicator scale,
D is the distance of the indicator mirror from the indicator scale.

Therefore, the energy V in a light ray pulse can be computed from Equation 5 since the values of $\theta_m$, c, I, K and R can be ascertained.

Figure 3:
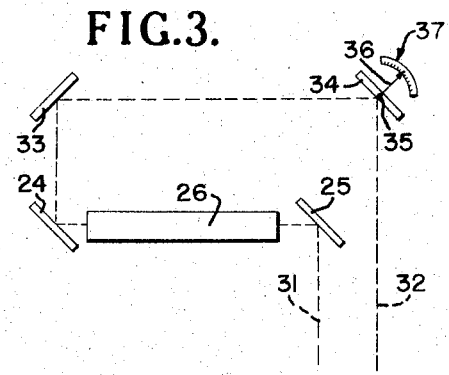
FIG. 3 is a schematic view of an optical system within the instrument for reflecting the output measured beams therefrom in closely spaced substantially parallel relation.

On FIG. 3 is shown in schematic form an optical system for use with the present invention in which both of the maser beams are transmitted outwardly from the instrument in closely spaced, substantially parallel relationship toward a target and in which one of the beams may be reflected, if desired, into intercepting relation with the other beam at a predetermined distance from the instrument. In this arrangement beam 31 reflected from mirror 25 is projected outwardly from the instrument at an angle of 90° with respect to the beam impinging the mirror. Beam 32 at an angle of 90° with respect to the beam emerging from the opposite end of the maser element is reflected by mirrors 33 and 34 in the order named and emerges from the instrument in closely spaced parallel relation with respect to beam 31 emerging from the instrument when mirror 34 is in the normal position shown. Mirror 34, it will be noted, is adjustable about an axis 35 and provided with a pointer 36 cooperating with a scale 37 having scale divisions thereof and indicia markings corresponding to the distance at which the beams 32 and 31 intersect when the mirror 34 has been moved slightly in a clockwise direction from the positions shown on the drawing.

Figure 4:
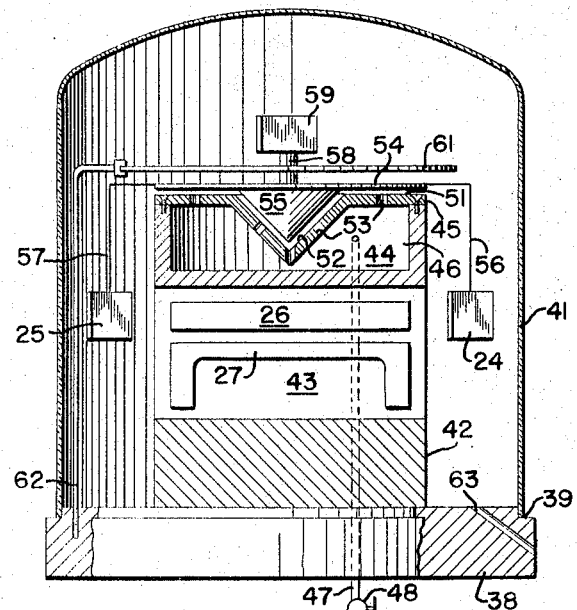
FIG. 4 is a view in section of the device of FIG. 1 according to an alternative form thereof.

On FIG. 4 is shown the instrument of FIG. 1 according to an alternative form thereof. The device of FIG. 4 comprises a base 38 having a register 39 formed thereon to receive and support a transparent generally cylindrical cover 41 composed of glass, clear plastic or the like substantially as shown. Secured to the central portion of the base 38 is a support 42 having an aperture 43 extending transversely therethrough within which is disposed the maser element 26 and flash tube 27 therefor in such manner that the maser element will discharge electromagnetic wave radiations simultaneously from opposite ends of the maser element through opposite portions of the aperture as the maser element is energized.

The upper portion of the support for the tube is provided with a circular recess 44 formed therein and covered by a cap 45 secured thereto in any suitable manner as by the screws illustrated. The cover encloses a chamber 46 connected as by a duct 47 to a valve 48 and thence to a pressure source 49 having a quantity of air under pressure therein. The cap 45 is provided with an external flat surface 51 contiguous with a conical surface 52. A plurality of apertures 53 are formed in the flat and conical surfaces of the cap 45 through which air flows when the valve 48 has been opened. A light disc-like member 54 having a centrally arranged conical portion 55 configured to the same angle as the conical surface 52 is placed on cap 45 and maintained in slightly spaced relation therefrom by air flowing through the apertures 53, the arrangement forming an air bearing of very low frictional resistance. The mirrors 24 and 25 are suspended by wire supports 56 and 57 secured to the disc-like member in such manner as to be opposite the end faces of the maser element 26 respectively and inclined at an angle with respect thereto when the mirrors 24 and 25 are in an initial position of rest, as in the arrangement of FIG. 1. The disc-like member is provided with an upstanding shaft 58 carrying a reflecting mirror 59 similar to the reflecting mirror 22 of FIG. 1 and adapted to receive light from a projector through the transparent cover 41 and reflect it onto a scale 29 similar to the arrangement of FIG. 1. A hairspring 61 is secured to the post 58 and to a rod 62 carried by the base 38 thereby to provide a light restoring force to the ballistic element for restoring it to an initial or zero position of rest when the beams from the maser have been measured. The base is provided with plurality of vents similar to the vent 63 illustrated through which the air flowing through apertures 53 is effectively exhausted from the device. The instrument of FIG. 4, it will be understood, is preferably provided with an optical system similar to that of FIG. 3 for directing the output beams therefrom in closely spaced, mutually parallel relation in the same direction, or in substantially the same direction depending on the setting of mirror 34. The output energy of the maser element of FIG. 4 can be measured in a manner similar to method employing with the device of FIG. 1, it being merely necessary to substitute a value of K corresponding to the spring constant of the hairspring 61 in Formula 4 for the value K of the torsion wire 19. Furthermore, the "radiometer effect" should be taken into consideration.

The measurements obtained from the instrument approach the actual energy of the beam within an error of 5 percent. Thus, it can be seen that an instrument for accurately measuring the energy in a light pulse has been devised. The radiation pressure of two maser pulses simultaneously impinging two reflecting surfaces respectively is measured and hence the total energy of the pulses. A torsion ballistic pendulum equipped with two mirrors which cause a directional momentum change of the light pulses and the consequent ballistic impulses to be imparted as a force couple to the torsion pendulum has thus been effected. The maximum angular reflection of the pendulum is proportional to the energy of the light pulses.

Whereas the device has been described with reference to the measurement of the energy of two light beams issuing respectively from opposite ends of a maser element, it is not so limited, as it may also be employed for measuring the momentum, radiation pressure or number of photons of the beam, if desired.

Whereas the invention has been described with particular reference to a device which is fired when the ballistic torsion element is at an initial position of rest, it is not so limited as, if desired, the maser element may be fired at the instant when the torsion element passes through an initial rest position during an oscillation thereof following a light energy measurement.

In this case the energy may be made manifest by the difference between the previous maximum deflection and the instant maximum deflection incated on the scale 29.

Obviously many modifications and variations of the present invention are possible in the light of the above teaching. It is therefore to be understood that within the scope of the appended claims, the invention may be practiced otherwise than as specifically described.

Having thus described the invention, what is claimed as new and desired to be secured by Letters Patent of the United States is:

1. In an output energy indicating optical maser instrument,
    a ballistic torsion balance arm,
    a pair of reflectors having their reflecting surfaces facing in a parallel relation with respect to each other and rigidly suspended from opposite ends of said balance arm respectively,
    means for supporting said balance arm at the midpoint thereof whereby rotational movement imparted to said arm member produces rotation about the axis of symmetry of said balance arm, a rod-like maser element arranged in parallel relation with said balance arm between the reflectors whereby outgoing beams from each end of the maser element are respectively directed onto the reflectors when the balance arm is in an initial position of rest, said reflectors being disposed at a 45° angle with respect to the beams emerging from the maser element such that the maser beams are reflected in opposite directions and at an angle of 90° with respect to the beams impinging the reflectors, thereby to impart a moment about the axis of symmetry of the balance arm relative to the energy of the beams.

a mirror having a beam of light focused thereon connected to said arm at the mid-point thereof and rotatable therewith, whereby the reflection of said beam of light from said mirror impinges upon an indicating scale indicating the degree of angular movement of said balance arm from the initial position of rest.

2. A device in accordance with claim 1, wherein the means for supporting the ballistic torsion balance arm comprises a torsion wire vertically mounted on a support stand by one end thereof with the other end connected to the mid-point of said balance arm through said indicating mirror.

3. A device in accordance with claim 1 wherein the means for supporting the ballistic torsion balance arm comprises:

an air bearing having a plate of flat angular configuration with a conical depressed section formed contiguously and coaxially therewith, said plate and conical section each being provided with a plurality of uniformly spaced apertures extending therethrough.

a chamber in communication with the lower portion of said apertures and having a duct exetending therefrom to a source of pressurized air, and a complementary rotatable bearing support for said arm configured for close fitting engagement with the upper surface of said plate and conical section and supported for rotation therefrom by the pressure of the air through said apertures.

4. A device according to claim 1 including an optical system for reversing the direction of propagation of the maser beam reflected from one of said reflectors and bringing the reversely directed output beam into converging relation with the output beam reflected from the other of said mirrors, whereby the energy of the maser beam may be measured without destroying the effectiveness thereof.

References Cited by the Examiner

UNITED STATES PATENTS 454,719  6/1891  Deshler.
816,330  3/1906  Johnston.

OTHER REFERENCES

Cook et al.: Measurement of Laser Output by Light Pressure, Proceedings of the IRE (July 1962), page 1693. TK 5700.17.

JEWELL H. PEDERSEN, *Primary Examiner.*

W. L. SIKES, *Assistant Examiner.*